Aug. 29, 1967     P. E. REGAN, JR     3,338,401
MOLDED SUTURE PACKAGE

Filed Dec. 7, 1964     3 Sheets-Sheet 1

INVENTOR:
PAUL E. REGAN JR.
BY
Charles A. Harris
ATTORNEY.

Aug. 29, 1967  P. E. REGAN, JR  3,338,401
MOLDED SUTURE PACKAGE
Filed Dec. 7, 1964  3 Sheets-Sheet 2
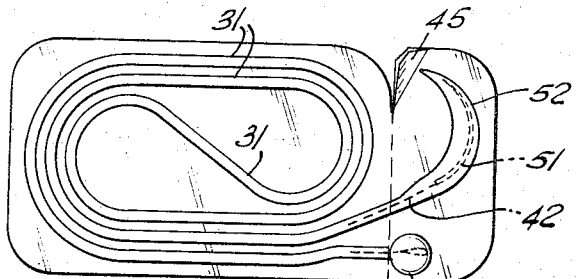
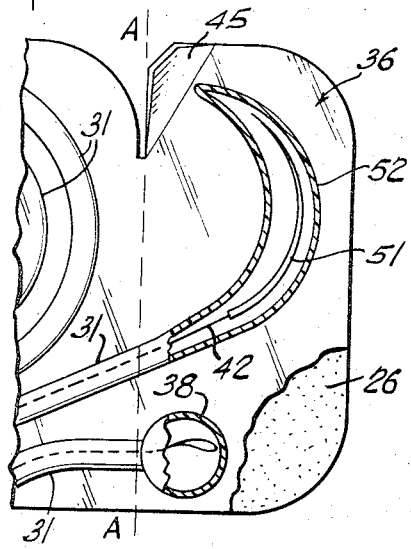
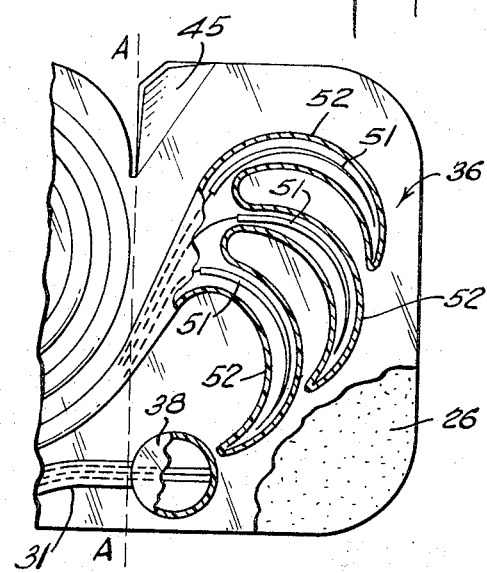
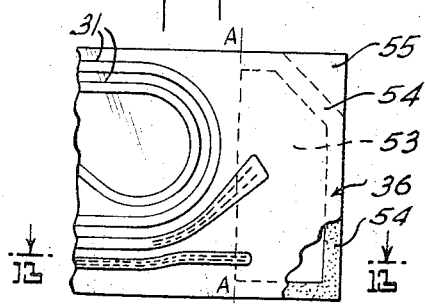
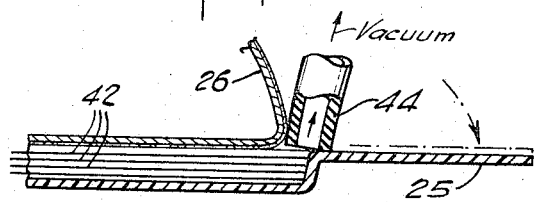
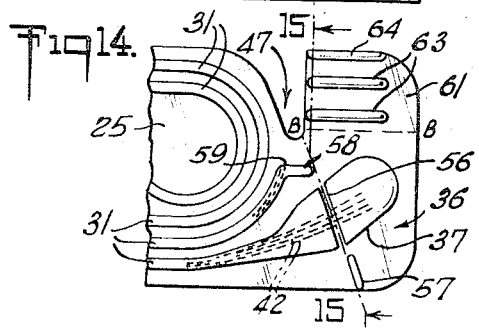
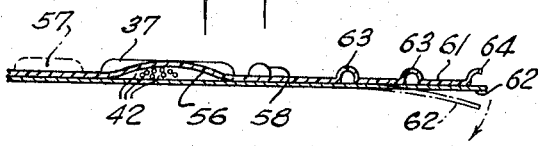
INVENTOR:
PAUL E. REGAN JR.
BY
Charles A. Harris
ATTORNEY.

Aug. 29, 1967  P. E. REGAN, JR  3,338,401
MOLDED SUTURE PACKAGE
Filed Dec. 7, 1964  3 Sheets-Sheet 3

INVENTOR:
PAUL E. REGAN JR.
BY
Charles A. Harris
ATTORNEY

United States Patent Office 3,338,401
Patented Aug. 29, 1967

3,338,401
MOLDED SUTURE PACKAGE
Paul E. Regan, Jr., Somerville, N.J., assignor to Ethicon, Incorporated, a corporation of New Jersey
Filed Dec. 7, 1964, Ser. No. 416,368
29 Claims. (Cl. 206—63.3)

ABSTRACT OF THE DISCLOSURE

This application discloses a molded suture package wherein one or more elongated sutures are contained in a coiled narrow passageway having a plurality of convolutions. In the preferred form disclosed, the package comprises a molded sheet and a cover sheet and the molded sheet defines a coiled channel having a plurality of convolutions. The channel is open to one side of the molded sheet and the cover sheet is sealed thereto continuously along both edges of the channel to form the aforesaid coiled passageway. The package of this invention also may include molded compartments and passages to facilitate access to the sutures contained therein, to accommodate needles attached thereto, or store sterilizing fluid, or the like. Preferably, the package is opened by stripping or separating portions thereof from one another.

---

The present invention relates to the packaging of elongated sutures and the like, most particularly to the packaging of delicate sutures and packaging several sutures in the same container.

Heretofore, elongated surgical sutures, i.e., sutures approximately 10 to 20 inches long, have been packaged singly or in groups in various manners, both with and without attached needles. Due to their length they normally have been wound in the form of a coil or upon a reel or looped and placed within a sleeve, or wound in some way to reduce the dimension of the package.

When the term "suture" or "sutures" is used in this application it shall mean surgical strands used for suturing, ligating and the like, and shall include such strands commonly called either sutures or ligatures.

Many problems have arisen in the packaging of delicate sutures such as silk sutures, thin stainless steel wire sutures and very small gauge sutures. In the case of sutures of silk, wire and various other materials, kinks and sharp bends have been formed in the suture during packaging and storage. This may render them unsuitable for delicate work and in some cases, due to the formation of weak spots and breaks in the suture, they cannot be used at all.

If the suture is very thin or brittle, it is subject to damage during winding and is not properly protected when the package is opened to remove the suture, particularly when several sutures are placed in the same package. Very fine gauge sutures are very difficult to handle and tend to become disarranged and entangled very easily because of their fineness.

When several sutures have been packaged together it has been necessary to remove the whole group of sutures from the package in order to separate one from the others. In many cases the sutures have been wound or looped around a reel or wound together in a coil and have become entangled with one another so that the group of sutures must be straightened out before one can be separated. In these cases, it is necessary to rewind or recoil the sutures which are not used and secure them together in some way or reinsert them in an envelope, or the like, so that they may be stored and then resterilized before reuse.

In accordance with this invention, the most delicate sutures may be packaged singly or in combination with several other sutures in such a way that they can be removed easily from the package and will not be kinked or contain any sharp bends or curves. The nature of the package is such that there is no necessity of winding the sutures in the ordinary manner so that the sutures are never exposed to winding stress or the like. Once the sutures are packaged they are fully protected against damage and remain protected until each suture is used. Several sutures may be placed together in the same package and the individual sutures may be removed easily one at a time from the package without disturbing the sutures remaining therein. The sutures may be packaged in groups with or without attached needles and may be removed one at a time from the package, as described above, with equal facility.

According to the present invention, the suture or sutures are packaged in a molded member defining a coiled passageway having a plurality of convolutions in such a way that the sutures are accessible at one end of the passageway and are adapted to be drawn individually therefrom without disturbing one another. The passageway is non-collapsible and permanently molded in the body member in such a way that it has a definite cross-sectional shape and inner surfaces which are smooth and possess a high degree of lubricity, i.e., exert a low frictional drag on sutures passing therethrough. The sutures are arranged loosely in the passageway in that they are not confined laterally by the walls thereof, and when a group of sutures are packaged together they are arranged in a loosely assembled bundle in substantially parallel alignment and non-entangling relation with one another. In the latter case, the coiled configuration of the passageway is such as to apply sufficient frictional drag on the suture bundle to prevent the bundle from being displaced when an individual suture is withdrawn from the bundle by pulling it endwise from the passageway. For this purpose, it is preferred that the passageway comprise more than two smoothly curved convolutions. In a preferred embodiment wherein the passageway is coiled in the form of a modified figure eight with both ends of the passageway extending beyond the coils at one end of the package, three such convolutions have been found to be advantageous.

In one embodiment of this invention, the package includes an access portion connected to the passageway with the suture extending into the access portion, and closure means connected to the molded member and sealing off the access portion and the passageway. The closure means preferably is designed so that it may be removed at least partially or opened to provide access to the suture through the access portion. Thus, the molded member and the sealed closure means may, themselves, provide a hermetically sealed primary package for a sterile suture.

According to the preferred embodiment of this invention, a suture package is provided which comprises a laminate of a first molded sheet and a second covering sheet. The molded sheet defines a narrow coiled channel having a plurality of convolutions with the channel being open to one side of the molded sheet. The covering sheet is sealed to the molded sheet continuously along both longitudinal edges of the channel to close the channel and form a coiled passageway. At least one elongated suture is positioned in the passageway in a coiled configuration corresponding to that of the passageway in such a way as to be accessible to one end of the passageway. Preferably, the molded sheet includes an access portion or chamber connected to one end of the channel for receiving one end of the suture and the closure sheet also seals off the access portion so that a hermetically sealed closure is formed for the suture. As suggested above, the covering sheet may be designed to be at least partially removable, such as by stripping from the molded sheet, to uncover the access portion for access to the suture.

In this form of the invention, the first sheet may be molded in such a way that the bottom of the coiled channel is depressed below the normal plane of the sheet and the convolutions of the channel are separated by narrow portions of the molded sheet which remain in the plane of the sheet. This allows the top of the channel to be sealed off by laying a sealable covering sheet flat across the top of the molded sheet and sealing it thereto. The moldable sheet may be formed from a suitable moldable plastic material such as vinyl chloride, vinyl acetate, vinyl acetate butyrate, styrene, polypropylene, linear polyethylene or the like, which remains sufficiently rigid after having been molded from sheets of normal thickness, say 8 to 10 mils, to provide a coiled passageway which is non-collapsible under ordinary conditions. The covering sheet must be capable of being sealed tightly to the molded sheet in such a way that the cover sheet and the molded sheet along the longitudinal edges of the channel cannot be easily separated. The covering sheet may comprise a barrier layer of a material such as aluminum foil and an inner heat sealing layer which is adapted to join the covering sheet to the molded sheet, and may include an outer protective layer of a material such as Mylar film. However, any covering sheet which is adapted to be sealed tightly to the exposed portions of the molded sheet and form a sealed unit may be used. When it is desired to strip a portion of the covering sheet from the molded sheet to open the package, the materials used and the sealing techniques applied must be chosen with this in mind. For ease in gripping the package, particularly when it is intended to be opened by stripping, non-slip means, such as a non-slip layer or mechanical gripping means, is included on the outer surfaces of the molded sheet and the cover sheet. When it is desired that the molded member and the cover sheet cooperate to form a hermetically sealed package for a sterile suture, they must be selected from sheet materials, such as those described above, which will provide the necessary barriers to the passage of bacteria and which are capable of being sterilized by irradiation, gaseous diffusion, heat, or the like without deterioration or loss of desired properties. This embodiment of the invention is particularly suited for forming a hermetically sealed package because it is adapted to be filled easily and sealed safely and then to be opened by stripping the cover sheet from one end of the package without danger of contaminating its sterile contents.

In another embodiment of this invention, wherein the coiled passageway is formed by molding sheet material, the package may comprise a laminate of a pair of molded sheets each of which has corresponding channels molded therein, in such a way, that when the sheets are superimposed the channels are joined to respectively form the top and bottom of the passageway. The two molded sheets may be joined to one another by heat sealing. In this form of the invention, both of the molded halves of the package may be formed from a single sheet which is folded over to superimpose the halves and form the passageway.

Preferably an access chamber, or chambers, connected to the passageway is molded in the package and the suture, or sutures, extends into the chamber. The package, then, is adapted to be opened through the access chamber by partially removing a strippable cover sheet, by tearing through the chamber, or the like, to reach the suture. The suture may include a needle attached to one end and the chamber may be shaped to accommodate the needle and provide easy access thereto. Multiple access chambers may be used to accommodate different needles, although more than one needle may be located in one chamber. When it is desired to package a suture pliabilizing fluid or a sterilizing fluid with the suture, a separate fluid chamber may be molded in the package and connected to the suture passageway by suitable grooves or channels provided for this purpose. It also is possible to load such a fluid directly in the suture passageway, itself, and then seal off the passageway in such a way that the fluid will not spill out.

Other and further advantages of this invention will appear to one skilled in the art from the following description and claims together with the drawings wherein:

FIG. 9 is a plan view of a package according to a modification of the embodiment of FIG. 1, wherein the access chamber is shaped to accommodate a needle attached to one end of the suture, or sutures.

FIG. 10 is an enlarged plan view of one end of the package of FIG. 9, partly broken away to show the needle in the access chamber and other features of this construction.

FIG. 11 is a plan view similar to FIG. 10 of a modification of the package of FIG. 9 wherein three shaped access chambers are provided.

FIG. 12 is a plan view of one end of a package according to another modification of the embodiment of FIG. 1, partly broken away for the sake of clarity.

FIG. 13 is an enlarged view partly in section and partly in elevation taken along the line 13—13 of FIG. 12, showing the package of FIG. 12 being loaded by vacuum.

FIG. 14 is a plan view of one end of the package according to still a different modification of the embodiment of FIG. 1, which includes a bending and positioning rib in the access chamber and different construction at the stripping flap.

FIG. 15 is an enlarged sectional view taken along the line 15—15 of FIG. 14.

Figure 1:
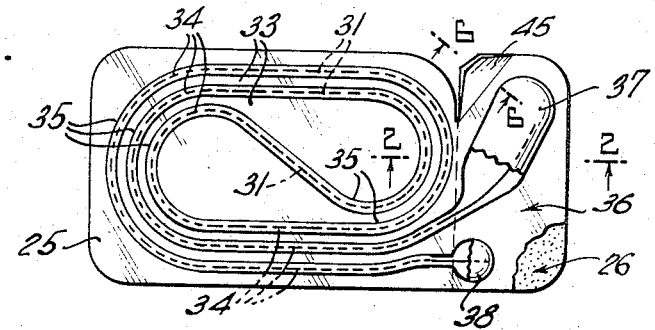
FIG. 1 is a plan view of a package according to a preferred embodiment of this invention, partly broken away to show certain features more clearly.

Referring to FIGS. 1–8, of the drawings, there is shown a package according to a preferred embodiment of this invention which comprises a laminate of a first molded sheet 25 and a second cover sheet 26. The molded sheet 25 defines a narrow coiled channel 27 having a plurality of convolutions with the channel being U-shaped in cross-section and open to one side of the molded sheet, i.e., the top 28 of the U faces this side of the sheet. The cover sheet 26 is sealed to the molded sheet 25 continuously along both longitudinal edges 29 of the channel to close the channel and form a closed coiled passageway 31 having a plurality of convolutions corresponding to those of the channel 27.

Figure 2:
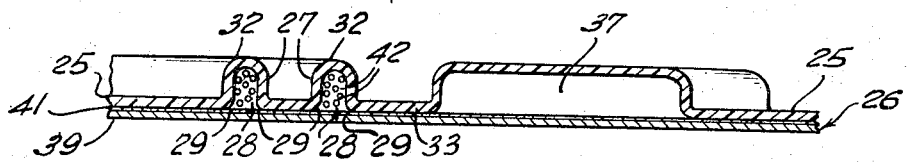
FIG. 2 is a greatly enlarged sectional view taken along the line 2—2 of FIG. 1.

The molded sheet 25 preferably is formed from a transparent plastic material having the properties described elsewhere in this application and which is capable of being molded by a vacuum technique, blow molded, or the like, to provide a sharply defined relatively rigid structure such as shown in section in FIG. 2. In this construction, the bottom 32 of the channel is depressed below the normal plane of the sheet, assuming that the bottom of the U-shaped channel is down; and the convolutions of the channel are separated by narrow portions 33 of the molded sheet which remain in the original plane of the sheet. In this embodiment, the channel 27 (and the resulting passageway 31) is molded in the form of a modified figure eight comprising three smoothly curved convolutions, more specifically in the form of six approximately straight legs 34 connected by smoothly curved loops 35. Both ends of the channel 27 and the passageway 31 formed by laminating the cover sheet with the molded sheet extend beyond the convolutions at one end of the package into a loading and dispensing section 36 of the package. One end of the passageway 31 terminates in a somewhat rectangular and oval-shaped access chamber 37 which also is molded in the first sheet 26 to approximately the same depth as the channel 27; and the other end of the channel terminates in a small vacuum well 38 also molded in the first sheet. The portions of the first or moldable sheet 25 surrounding the access chamber 37 and the vacuum well 38 also remain in the original plane of the moldable sheet. Thus, it is an important advantage of this embodiment that the laminate may be formed by placing a flat heat sealable cover sheet 26 against the open side of the moldable sheet 25 and applying sufficient heat and pressure thereto, while holding the moldable sheet in the desired configuration to assure that permanent and tight seals are formed between the cover sheet 26 and the molded sheet 25 all along the longitudinal edges of the channel 27 and the resulting passageway 31. This assures that the convolutions of the passageway 31 are sharply defined and separated from one another and that there is no leakage, or jamming of the sutures between the cover sheet and the narrow portions 33 of the molded sheet, in areas where the package is not properly sealed. In the construction shown, the cover sheet 26 comprises a barrier layer 39 and a heat sealable layer 41 which is firmly attached to the barrier layer and capable of forming a strong permanent seal with the material of the molded sheet 25.

Figure 3:
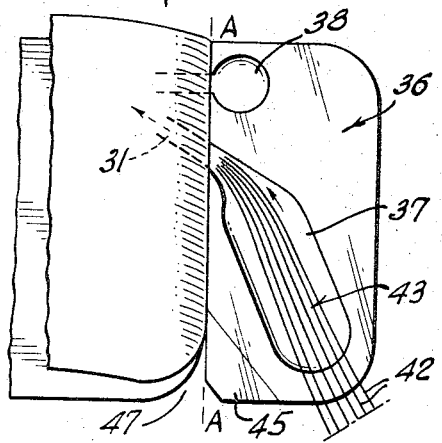
FIG. 3 is an enlarged plan view of one end of the package of FIG. 1 showing the arrangement of the parts with the package inverted and a bundle of sutures inserted through the access chamber into one end of the suture passageway preparatory to drawing the sutures into the passageway by vacuum.
Figure 4:
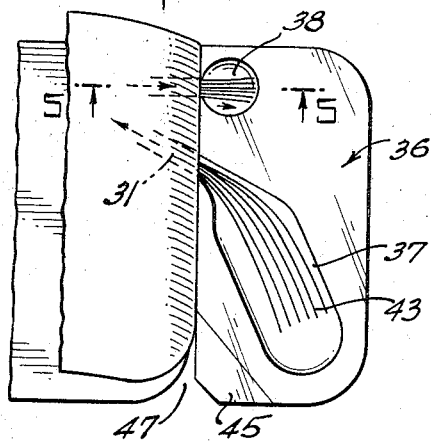
FIG. 4 is a similar enlarged plan view of the same end of the package just after the sutures have been drawn into the passageway.
Figure 5:
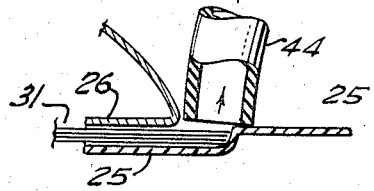
FIG. 5 is an enlarged view partly in section and partly in elevation taken along the line 5—5 of FIG. 4 showing the application of vacuum to one end of the passage for drawing the sutures into position.
Figure 7:
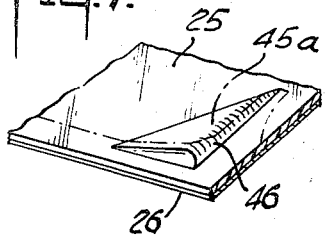
FIG. 7 is a somewhat enlarged view in perspective of the laminate from which the package of FIG. 1 is made prior to die cutting in way of the stripping flap.

Referring in particular to FIGS. 3–5, the cover sheet 26 first is sealed to the molded sheet 25 up to the line A—A to form the suture passageway 31. This leaves the molded sheet 25 and the cover sheet 26 unsealed to one another to form the loading and dispensing section 36 in the area between the line A—A and the adjacent end of the package. Then, as illustrated in FIGS. 3–5, the sutures 42 to be placed or loaded in the package, which conveniently may be in the form of a loosely assembled bundle 43 of a multiplicity of sutures (a typical package may include 17 silk sutures, each 18 inches long), are inserted endwise through the access chamber 37 into the passageway connected thereto. At this time the cover sheet 26 may be folded back out of the way about the line A—A, roughly as shown in FIGS. 3 and 4. A suitable vacuum is applied to the opposite end of the passageway 31 through the vacuum well 38 by placing a flexible hose 44 connected to a suitable vaccum source, not shown, over the vacuum well, roughly as shown in FIG. 5. This will draw the whole bundle 43 of sutures rapidly into the passageway 31 and completely through the convolutions thereof until they reach the vacuum well. Assuming that the length of the passageway 31 is designed to accommodate the lengths of the sutures 42 loaded, this will result in the suture bundle 43 assuming the position, roughly as shown in FIG. 4 with the trailing ends of the sutures extending into the access chamber 37 where they are readily accessible once the access chamber is opened. Then, the access chamber 37 and the vacuum well 38 are sealed off to completely enclose the sutures 42 by folding the unsealed portion of the cover sheet 26 down flat over the molded sheet 25 in the loading and dispensing section 36 of the package, and sealing it tightly to the molded sheet.

Figure 6:
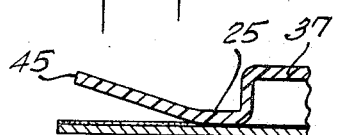
FIG. 6 is an enlarged sectional view taken along the line 6—6 of FIG. 1 showing the upstanding stripping flap for opening the package.
Figure 8:
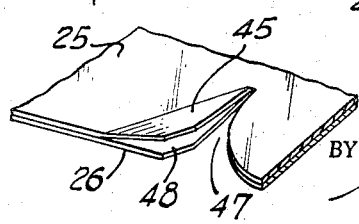
FIG. 8 is a view in perspective similar to FIG. 7 showing the same portion of the package after die cutting.

The materials of the cover sheet 26 and the molded sheet 25 are selected and the sealing is carried out in such a way that a strippable seal is formed between the cover sheet and the molded sheet in the dispensing section 36 of the package. To assure that the cover sheet and the molded sheet can be easily separated for stripping the cover sheet from the molded sheet to provide access to the sutures 42 in the access chamber 37 thereof, a raised stripping flap 45 is molded in the molded sheet 25 in such a way that it normally extends upwardly at an angle from the plane of the molded sheet 25 and the flat cover sheet 26 sealed thereto in other areas, roughly as shown in FIG. 6. This inclined stripping flap 45 is not sealed to the cover sheet but remains separated therefrom for easy gripping. The molded flap 45 may be formed conveniently by molding a depressed section 46 having an inclined flat bottom 45a into the molded sheet at the same time the other portions of this sheet are molded. Then, the inclined flap 45 may be formed by removing two sides of the molded section 46 at the time the molded sheet is die cut. This also forms a stripping notch 47 which extends into the package alongside the flap 45. When the molded sheet 25 and the cover sheet 26 are die cut together, as is preferred, the result will be as shown in FIG. 8. The resulting inclined molded flap 45 extends at an angle into the package. As a result, this flap and the corresponding unsealed flap portion 48 of the cover sheet may be gripped easily and pulled away from one another to exert stripping force toward the end of the package and separate the cover sheet from the molded sheet in the dispensing section 36 and thereby open the access chamber 37 thereof to provide access to the sutures 42.

The channel 27 is permanently molded in the first sheet 25 in such a way that it has a definite U-shaped cross-section and has smooth inner surfaces possessing a high degree of lubricity, as defined hereinbefore. The sutures 42, themselves, are arranged in the resulting passageway 31 in a loosely assembled bundle in substantially parallel alignment and non-entangling relation with one another, and the suture bundle is in no way constricted laterally by the passageway. However, the coiled configuration of the passageway 31, i.e., the modified figure eight of this embodiment is such as to apply sufficient frictional drag on the suture bundle as will prevent the bundle from being displaced longitudinally in the passageway when an individual suture is withdrawn from the bundle by pulling it endwise from the passageway. This allows the sutures 42 to be removed from the passageway 31, one or two at a time, without disturbing the other sutures. Furthermore, the loosely coiled non-entangling arrangement of the sutures assures that they will be relatively straight and free from kinks when removed from the package.

FIGS. 9 and 10 illustrate a modification of this package wherein the suture or sutures includes a curved needle 51 attached to one end thereof located in an access chamber 52 which is shaped to accommodate the needle. While in FIGS. 9 and 10, a single needle is shown attached to a single suture for clarity in illustration, several such needles may be attached to several sutures arranged in a bundle and the resulting group of needles, not shown, may be located in the access chamber. FIG. 11 illustrates another modification wherein a group of three shaped access chambers 52 are connected to the access end of the passageway 31 for accommodating a larger number of curved needles 51. This construction is preferred when a relatively large number of needled sutures are to be packaged, in which case a plurality of needles would be positioned in each of the three shaped access chambers 52.

FIGS. 12 and 13 illustrate a modification wherein the access chambers of the preceding embodiments, as such, is almost completely replaced by an access portion 53 wherein the cover sheet 26 is unsealed to the molded sheet 25 in the loading and dispensing section 36 of the package. In this modification the vacuum well also is eliminated. As a result, both ends of the passageway 31 extend into and terminate in the unsealed access portion 53 of the package and the sutures are accessible through this access portion when this end of the package is stripped open. In this case, the sutures are loaded by applying a vacuum to the opposite end of the passageway before the cover sheet is sealed down over the loading section 36 of the package substantially as shown in FIG. 13 and described in connection with FIG. 5. As illustrated in FIG. 12, the cover sheet is sealed to the molded sheet all around the access portion 53 along a sealing bar 54 which cuts across one corner of the package to leave unsealed triangularly-shaped stripping flaps 55 for opening the package. This provides a complete enclosure for the sutures.

FIGS. 14 and 15 illustrate a preferred modification of this invention wherein the access chamber includes a rib 56 about which the end of the chamber 37 is adapted to be folded back away from the normal plane of the molded sheet 25 to facilitate grasping the sutures 42 when the package is stripped open. This rib 56 lies on a triangular fold line which extends to the stripping notch 47 on the other side of the package and through an auxiliary folding rib 57 adjacent the opposite side of the chamber 37. The vacuum well of the preceding embodiments also has been eliminated and replaced by a bent vacuum section 58 at the vacuum end of the suture passageway 31. This bent section 58 facilitates loading because the sutures strike the bent far wall 59 thereof and are not easily turned and drawn into the vacuum applying means, not shown, during loading. After loading a bundle of sutures 42 in such a way that the trailing ends thereof are lying across the folding rib 56 traversing the access chamber, the loading and dispensing section 36 of the package is sealed off around the access chamber 37 up to the line B—B, thereby leaving unsealed stripping flap portions 61 and 62 of the molded sheet and the cover sheet, respectively, beyond the line B—B. A set of three longitudinal gripping ribs 63 is included on the outer surface of the stripping flap portion 61 of the molded sheet for gripping purposes. The molded sheet is die cut longitudinally through the outside rib in this group to provide a raised lip 64 to facilitate separating the stripping flaps 61 and 62, as shown in FIG. 15. The following rib 56 traverses the access chamber 37 and is depressed centrally thereof in such a way that the suture bundle rests against the depressed portion of the rib, as shown in FIG. 15. When the stripping flaps 61 and 62 are pulled apart and the package is opened down to or slightly beyond the folding rib 56 in the access chamber 37, the outside end of the access chamber may be bent back about the rib 56 so that both the molded sheet and the cover sheet can be folded back out of the way of the suture ends lying across the rib 56; thereby providing maximum access to the sutures when the package is opened. An additional feature of this modification is that the package may be torn open by pulling the stripping flap portion of the dispensing section 36 thereof sharply against the notch 47 and along the somewhat weakened line defined by the folding rib 56 and the auxiliary rib 57 in the molded sheet. When this is done, if desired for any reason, the access chamber 37 may be torn along the folding rib 56 to leave the sutures 42 protruding from the remaining portion of the chamber.

Figure 16:
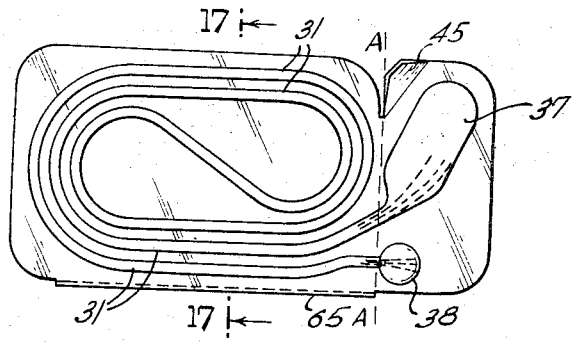
FIG. 16 is a plan view of a package according to a somewhat different embodiment of this invention, wherein both halves of the package are molded.
Figure 17:
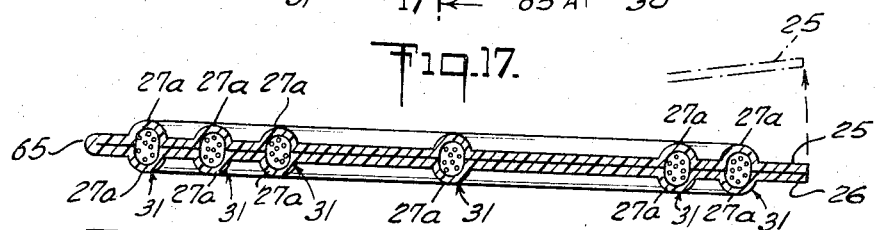
FIG. 17 is an enlarged view partly in section and partly in elevation taken along the line 17—17 of FIG. 16.

FIG. 16 illustrates a suture package according to a somewhat different embodiment of the invention, wherein both halves of the package, i.e., the first sheet 25 and the cover sheet 26 are correspondingly molded so that when they are superimposed the top and bottom halves of the suture passageway 31 are formed, respectively, by molded channels 27a in the top and bottom sheets of the laminated structure. In the form shown, both of the molded halves of the package are formed from the same sheet of material which then is folded in such a way, about the line 65, as to superimpose its halves and form the suture passageway 31. Among the advantages of this construction are that, either a deeper suture passageway 31 may be formed with channels of the same depth as those utilized in the preceding embodiments, or as shown in FIG. 17 a passageway roughly as deep as those of the preceding embodiments may be formed utilizing much shallower molded channels 27a. This may facilitate molding and provide more uniform wall thickness throughout the package. In this embodiment, the access chamber 37 may be molded only in one-half, i.e., one of the laminating sheets, or in both of said sheets. However, normally the vacuum well 38 would only be directly connected to the channel 27a in the sheet in which it is formed.

Figure 18:
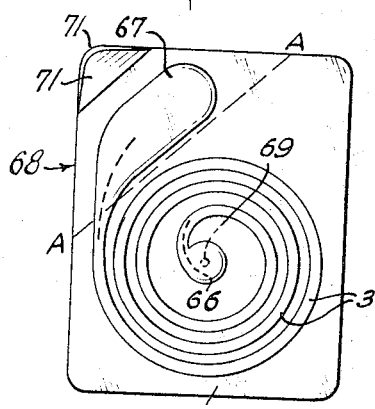
FIG. 18 is a plan view of a package according to still a different embodiment of this invention wherein the coiled suture passageway is in the form of a spiral.

FIG. 18 illustrates another embodiment of this invention wherein the coiled passageway 31 is in the form of a spiral having three convolutions. This package is basically the same in construction as the other embodiments illustrated, with the exception that the vacuum end of the passageway 31 terminates in a vacuum well 66 located in the center of the package and the opposite end of the package terminates in an access chamber 67 located in one corner of the package. This results in the shape of the package being somewhat closer to a square than those of the preceding figures. As in the preceding embodiments, the passageway 31 is formed by sealing the cover sheet to the molded first sheet 25 up to a line A—A where the passageway 31 joins the access chamber 67. This line A—A corresponds to line A—A of the preceding embodiments and the corner portion 68 of the package of FIG. 18 beyond the line A—A corresponds to the loading and dispensing section of the package of the preceding figures. Again, the sutures are loaded in this embodiment, as described in connection with the preceding figures, with the single exception that the vacuum is applied to the vacuum well through a hole 69 in the cover sheet. When the sutures are loaded, the hole 69 may be sealed off by pressing the cover sheet into and against the walls of the vacuum well 66 to form a seal all around the hole. The dispensing section 68 of the package is sealed off as described in connection with the preceding figures and the triangular corner of the package adjacent the dispensing section is left unsealed to provide stripping flaps 71 for opening the package.

Figure 19:
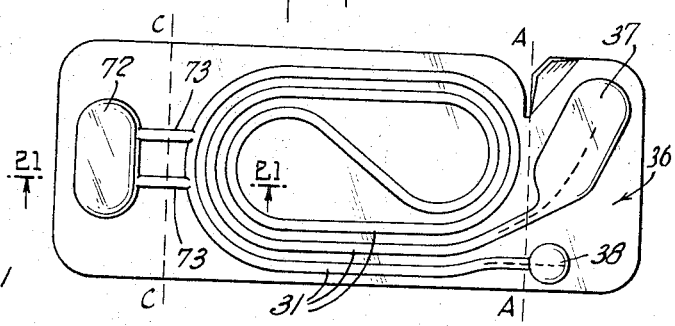
FIG. 19 is a plan view of another embodiment of this invention wherein the package includes a fluid chamber connected to the suture passageway.
Figure 20:
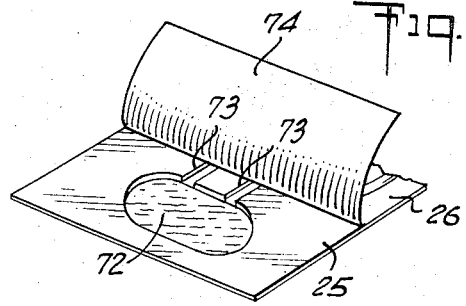
FIG. 20 is a somewhat enlarged view in perspective of the end of the package which includes the fluid chamber with the cover sheet folded back as it would be for loading the chamber.
Figure 21:
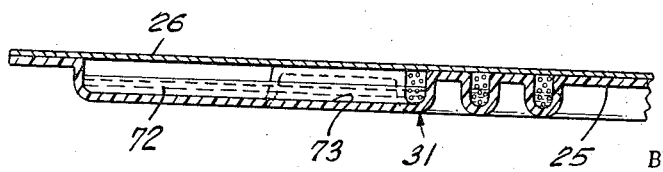
FIG. 21 is an enlarged sectional view taken along the line 21—21 of FIG. 19.

FIGS. 19–21 illustrate still another embodiment wherein the construction is substantially identical with that of the embodiment of FIGS. 1–8 except that the package is somewhat elongated and includes a liquid chamber 72 at the end opposite to that of the loading and dispensing section 36. The liquid chamber 72 is molded in the first sheet 25 and connected to the suture passageway 31 by a pair of spaced grooves 73 which also are molded in the first sheet. The liquid chamber 72 and the connecting grooves 73 are depressed in the first sheet approximately to the level of the bottom of the suture passageway 31, as shown in FIG. 21. The cover sheet 26 first is sealed down over the molded sheet 25 to complete the suture passageway 31 in the center section of the package between the lines A—A and C—C, leaving the area around the liquid passageway unsealed, as shown in FIG. 20. The loading section 36 at the opposite end of the package also is left unsealed for loading the sutures, as described hereinbefore. When the sutures are loaded by applying vacuum to the vacuum well 38, the unsealed portion 74 of the cover sheet 26, shown folded up in FIG. 20, will be drawn by the vacuum tightly down over the liquid chamber 72 and the connecting grooves 73 to seal them off sufficiently to allow the vacuum to draw the sutures through the passageway 31, as described in connection with the foregoing embodiments. Then, the unsealed portion 74 of the cover sheet is lifted up as shown in FIG. 20, and the desired suture pliabilizing or sterilizing fluid may be deposited in the liquid chamber 72 with the package positioned horizontally, as shown. After this, the unsealed portions of the cover sheet are pressed down against the molded sheet at both ends of the package and sealed tightly thereto all around the liquid chamber 72 and the connecting grooves 73 at one end of the package, and around the access chamber 37 and the well 38 at the other end of the package to form a sealed package containing both the sutures and the liquid. As shown in FIG. 21, the liquid will work its way through the connecting grooves into and throughout the suture passageway. A mass of absorbent material such as cellulose sponge, not shown, may be placed in the liquid chamber 72 for holding the liquid. In this case, the absorbent mass may first be saturated with the liquid and then conveniently loaded into the liquid chamber, or the absorbent material may be placed dry in the liquid chamber and then saturated with the liquid before the unsealed portion 74 of the cover sheet is sealed down. In either case, loading of the liquid is facilitated.

As indicated hereinbefore, the molded portion of the package may be formed from any suitable moldable material which will give the desired properties, but preferably is a transparent plastic material which is relatively inexpensive. It is desirable that at least one portion of the package be transparent in order to view the contents and determine easily how many sutures are left in the package. In the embodiments of all of the foregoing figures, it is convenient that the molded sheet, itself, be transparent for this purpose. When it is desired that the package be heat sterilizable, polypropylene is the preferred material for the molded portion. However, when it is not necessary that the package be subjected to heat or steam sterilization temperatures, vinyl chloride, vinyl acetate, vinyl acetate butyrate, styrene, polypropylene, linear polypropylene, or the like may be used. A laminate of more than one of these materials may be used for this purpose. The vinyls have been found to be particularly suitable for the molded member because they have excellent sealing properties with vinyl sealing layers applied to foil-backed cover sheets. Similarly, when the package must be subjected to heat sterilization, the cover sheet and the seal between the cover sheet and the molded sheet must be capable of withstanding these temperatures without deterioration of the materials or weakening of the seals. For this purpose, it may be desirable to also use polypropylene for the cover sheet. A preferred cover sheet comprises a barrier layer of aluminum foil, and an inner heat sealing layer of vinyl material laminated to the foil and particularly adapted to form a strippable seal with a vinyl molded sheet. A polyester (Mylar) film protective layer preferably is applied to the other side of the foil layer to protect it from electrolytic corrosion and the like and cover any pinholes in the foil. To provide non-slip means for the cover sheet, an additional non-slip layer comprising a dispersion of silica particles in a polyester base, is laminated to the polyester protective layer. This non-slip layer facilitates gripping of the cover sheet when it is wet and in cooperation with non-slip means such as the ribs 63 on the stripping flap of the molded sheet, allow the package to be gripped and stripped open easily, even under adverse conditions.

Having now described the invention in specific detail and exemplified the manner in which it may be carried into practice, it will be readily apparent to those skilled in the art that innumerable variations, applications, modifications, and extensions of the basic principles involved may be made without departing from its spirit or scope.

Wherefore I claim:

1. A suture package which comprises a laminate of a first molded sheet and a second cover sheet, said molded sheet defining a coiled channel having a plurality of convolutions, said channel being open to one side of said first sheet, said cover sheet being sealed to the open side of said molded sheet continuously along both longitudinal edges of said channel to close the channel and form a closed coiled passageway, and an elongated suture in said passageway.

2. A suture package according to claim 1, wherein the walls of said channel are relatively rigid and said passageway is noncollapsible and possesses a definite cross-sectional shape.

3. A suture package according to claim 1, wherein the bottom of the coiled channel is depressed below the normal plane of the molded sheet and the convolutions of the channel are separated by narrow portions of the molded sheet which remain in the plane of the sheet, said cover sheet being flat and sealed to the molded sheet both between and surrounding said convolutions.

4. A sterile suture package according to claim 3, wherein the cover sheet has an inner surface which is firmly sealed to the molded sheet by the application of heat and pressure to the areas to be sealed.

5. A sterile suture package according to claim 4, wherein said molded sheet and said cover sheet both act as barriers to the passage of bacteria therethrough and are hermetically sealed to one another to provide a sterile enclosure for said suture.

6. A suture package according to claim 1, wherein said cover sheet also is a molded sheet and defines a coiled channel corresponding in configuration to the channel of said first molded sheet and the open sides of said sheets are sealed to one another so as to superimpose their respective channels and form a closed coiled passageway between them.

7. A suture package according to claim 6, wherein the first molded sheet and the molded cover sheet both are formed from halves of the same sheet of moldable material, and said sheet of material is folded to superimpose its halves to form the package.

8. A suture package according to claim 1, wherein the cover sheet seals off both ends of the passageway and with the molded sheet forms a sealed enclosure for the suture, and one end of said package is adapted to be opened to provide access to the suture at one end of the passageway.

9. A suture package according to claim 8, wherein a portion of the cover sheet is adapted to be stripped away from the molded sheet to provide the aforesaid access.

10. A suture package according to claim 9, wherein the outside surfaces of said molded sheet and said cover sheet each include nonslip means to facilitate gripping thereof for opening the package.

11. A suture package according to claim 9, wherein an edge portion of the molded sheet is depressed slightly from the normal plane of the molded sheet and spaced from the cover sheet at the end of the package which is adapted to be opened to facilitate separating the cover sheet from the molded sheet for opening the package.

12. A suture package according to claim 11, wherein the portions of said molded sheet and said cover sheet adjoining said edge portion are unsealed to one another to provide stripping flaps for opening the package.

13. A suture package according to claim 8, wherein said molded sheet defines a fluid chamber connected to said channel by a pair of spaced grooves and said cover sheet seals off said fluid chamber and said grooves, and which further comprises a fluid in said fluid chamber.

14. A suture package according to claim 8, wherein the molded sheet defines an access chamber connected to one end of the passageway, the suture is accessible through said access chamber, and the cover sheet seals off the access chamber.

15. A suture package according to claim 14, wherein said package is adapted to be torn through said access chamber to provide access to the suture.

16. A suture package according to claim 14, wherein said cover sheet is adapted to be stripped from the molded sheet to open said access chamber and provide access to the suture.

17. A suture package according to claim 16, wherein said access chamber includes a rib about which the end of the chamber is adapted to be folded away from the normal plane of the molded sheet to facilitate grasping the suture when the package is stripped open.

18. A suture package which comprises a body member permanently molded to define a coiled narrow passageway having a plurality of convolutions, said passageway being noncollapsible and having a definite cross-sectional shape and smooth inner surfaces possessing a high degree of lubricity, and a plurality of elongated sutures in said passageway, said sutures being arranged in a loosely assembled bundle in substantially parallel alignment and nonentangling relation with one another, the coiled configuration of the passageway being such as to apply sufficient frictional drag on the suture bundle to prevent the bundle from being displaced when an individual suture is withdrawn from the bundle by pulling it endwise therefrom.

19. A suture package according to claim 18, wherein the passageway comprises more than two smoothly curved convolutions.

20. A suture package according to claim 19, wherein the coiled passageway comprises at least about six legs connected by smoothly curved loops.

21. A suture package according to claim 19, wherein the passageway is coiled in the form of a spiral.

22. A suture package according to claim 19, wherein the passageway is coiled in the form of a modified figure eight.

23. A suture package according to claim 22, wherein both ends of the passageway extend beyond the convolutions at one end of the package.

24. A suture package which comprises a body member molded to define a coiled narrow passageway having a plurality of convolutions and a widened access chamber connected to said passageway, an elongated sterile suture in said passageway and extending into said access chamber, and closure means normally sealing off said access chamber and said passageway but being removable from at least said chamber to provide access to the suture therein.

25. A suture package according to claim 24, wherein said body member includes a plurality of access chambers.

26. A suture package according to claim 24, wherein the suture includes a needle affixed to one end, the chamber is shaped to accommodate the needle, and the needle is located in the chamber.

27. A suture package which comprises a laminate of a first molded sheet and a second cover sheet, said molded sheet defining a narrow channel having a plurality of convolutions coiled in the form of a modified figure eight, said channel being open to one side of said first sheet, said cover sheet being sealed to the open side of said molded sheet continuously along both longitudinal edges of said channel to close the channel and form a closed coiled passageway, a loading and dispensing section at one end of the package, both ends of said passageway extending beyond the convolutions into said loading and dispensing section, and an elongated suture in said passageway accessible to said loading and dispensing section.

28. A suture package according to claim 27, which comprises an access chamber molded in said first sheet and located in said loading and dispensing section, said access chamber being connected to one end of the suture passageway and said suture being accessible through said access chamber.

29. A suture package according to claim 28, wherein said cover sheet is adapted first to be folded back along the edge of said loading and dispensing section to facilitate loading of the package and then folded down flat and sealed over the loading and dispensing section of the package to seal off the access chamber and both ends of the suture passageway.

References Cited

UNITED STATES PATENTS

| 2,583,043 | 1/1952 | Dean | 206—63.3 |
| 2,615,565 | 10/1952 | Bower et al. | 206—63.3 |
| 2,899,046 | 8/1959 | Cox | 206—42 |

FOREIGN PATENTS 188,948  11/1922  Great Britain.

THERON E. CONDON, *Primary Examiner.*

WILLIAM T. DIXSON, JR., *Examiner.*